(12) United States Patent
Muramatsu et al.

(10) Patent No.: US 11,033,811 B2
(45) Date of Patent: Jun. 15, 2021

(54) CONTROLLER AND COVER MEMBER

(71) Applicant: HORI CO., LTD., Yokohama (JP)

(72) Inventors: Hiroaki Muramatsu, Yokohama (JP); Koichiro Amano, Yokohama (JP); Yoshinori Konishi, Yokohama (JP)

(73) Assignee: HORI CO., LTD., Yokohama (JP)

( * ) Notice: Subject to any disclaimer, the term of this patent is extended or adjusted under 35 U.S.C. 154(b) by 0 days.

(21) Appl. No.: 16/337,374

(22) PCT Filed: Dec. 4, 2017

(86) PCT No.: PCT/JP2017/043475
§ 371 (c)(1),
(2) Date: Mar. 28, 2019

(87) PCT Pub. No.: WO2018/105556
PCT Pub. Date: Jun. 14, 2018

(65) Prior Publication Data
US 2020/0030694 A1     Jan. 30, 2020

(30) Foreign Application Priority Data

Dec. 9, 2016  (JP) .............................. JP2016-239434

(51) Int. Cl.
*A63F 13/24* (2014.01)
*A63F 13/98* (2014.01)
(Continued)

(52) U.S. Cl.
CPC .............. *A63F 13/24* (2014.09); *A63F 13/98* (2014.09); *G06F 3/0338* (2013.01); *H01H 3/02* (2013.01); *H01H 25/04* (2013.01)

(58) Field of Classification Search
CPC ...... G06F 3/0205; G06F 3/0338; G06F 13/98; A63F 13/24; H01H 2221/012
See application file for complete search history.

(56) References Cited

U.S. PATENT DOCUMENTS

| | | | |
|---|---|---|---|
| 4,786,768 A | * 11/1988 | Langewis | .............. G05G 9/047 200/330 |
| 4,825,019 A | * 4/1989 | Fisher | ................... G05G 9/047 200/6 A |

(Continued)

FOREIGN PATENT DOCUMENTS

| | | |
|---|---|---|
| JP | H-04-114390 | 10/1992 |
| JP | H-07-033394 | 6/1995 |
| JP | H09-262366 A | 10/1997 |

OTHER PUBLICATIONS

International Search Report and Written Opinion received in corresponding International Application PCT/JP2017/043475, 9 pages.

(Continued)

*Primary Examiner* — David L Lewis
*Assistant Examiner* — Robert E Mosser
(74) *Attorney, Agent, or Firm* — Michael Bednarek; Bednarek Legal, PLLC

(57) ABSTRACT

Provided is a technology of allowing operation of four push buttons of a controller including the four push buttons provided in place of a cross key pad as if operating the cross key pad. The controller includes a third push-button input module (142) being a cylindrical recess including four push buttons (142A to 142D) on a bottom surface of the third push-button input module (142). A recessed portion (142E) is formed in the bottom surface. Meanwhile, the controller includes a cover member (200) having a circular plate portion (211) including a cross-key-pad portion (212). A column portion having a circular column shape is provided on a back surface of the cover member (200). The cover member (200) is fixed to the third push-button input module (142) through insertion of the column portion into the recessed portion (142E). When a user presses the cross-key-pad portion (212), freely selected one of the four push (Continued)

buttons (142A to 142D) positioned below the circular plate portion (211) can be pressed.

8 Claims, 9 Drawing Sheets

(51) Int. Cl.
*G06F 3/0338* (2013.01)
*H01H 3/02* (2006.01)
*H01H 25/04* (2006.01)

(56) References Cited

U.S. PATENT DOCUMENTS

| | | | |
|---|---|---|---|
| 4,945,357 A | 7/1990 | Tal | |
| 5,034,574 A * | 7/1991 | Martovitz | G06F 3/0205 200/6 A |
| 5,343,219 A * | 8/1994 | DuBosque, Jr. | G05G 9/047 200/6 A |
| 5,476,261 A * | 12/1995 | Hultstrand | A63F 13/08 273/148 B |
| 5,883,690 A * | 3/1999 | Meyers | A63F 13/02 345/161 |
| 5,976,018 A * | 11/1999 | Druckman | A63F 13/08 463/47 |
| 6,811,491 B1 * | 11/2004 | Levenberg | A63F 13/02 463/47 |
| 8,941,594 B2 * | 1/2015 | Rehbock | G06F 3/0205 200/314 |
| 2016/0317920 A1 | 11/2016 | Schmitz et al. | |

OTHER PUBLICATIONS

European Search Report issued in Application No. PCT/JP2017043475, dated Jun. 11, 2020.

\* cited by examiner

1

CONTROLLER AND COVER MEMBER

CROSS REFERENCE TO RELATED APPLICATIONS

The present application is a U.S. National Stage of International Application No. PCT/JP2017/043475 filed on Dec. 4, 2017, which claims the benefit of Japanese Patent Application No. 2016-239434 filed on Dec. 9, 2016, the entire disclosures of all of which are incorporated herein by reference.

TECHNICAL FIELD

The present invention relates to a controller, in particular, a controller configured to give input to, for example, a game machine being a home-use single-purpose game machine or a personal computer capable of executing a game.

BACKGROUND ART

Hitherto, a video game has been widely used. A user enjoys a video game by using some kind of device (platform). There are various kinds of platforms for executing a video game, such as a home-use game machine of a stationary type, a general-purpose personal computer, a handheld game console, a cell phone, a smartphone, and a game machine installed in an amusement facility, for example, a video arcade.

Any platform requires a device configured to give input to the machine constructing the platform. Such a device is frequently implemented as a controller.

Examples of the home-use game machine of a stationary type are PlayStation 4 (trademark) manufactured and distributed by Sony Interactive Entertainment Inc. and Xbox One (trademark) manufactured and distributed by Microsoft Japan Co., Ltd. In those game machines, a dedicated genuine controller is usually attached or sold separately, and a user enjoys a game by usually using the genuine controller. Genuine controllers were once provided in various designs, but a dominant design thereof is now established to some extent. A dedicated genuine controller in the dominant design includes an oblong body to be grasped by both hands, whose left half includes a cross key pad allowing, for example, digital input in four directions, and a stick input device allowing, for example, analog input based on a tilt direction thereof, and whose right half includes four push buttons and such a stick input device as described above.

However, not all of controllers employ the above-mentioned dominant design. For example, there has been proposed a controller in which the above-mentioned cross key pad is replaced with four push buttons arranged at positions corresponding to, for example, distal ends of four arms of the cross (it can also be defined as four vertices of a square).

The cross key pad usually has a configuration in which the four arms are arranged at positions corresponding to front, rear, right, and left as seen from a user, and a user can freely perform any one of four types of input including front, rear, right, and left by pressing any one of the distal ends of the four arms of the cross key pad. Further, a user can also press two arms at the same time by pressing a middle portion between freely selected two adjacent arms of the four arms of the cross key pad. However, the cross key pad has a disadvantage, in terms of its mechanism, in that two arms which are not adjacent to each other, in other words, two arms provided on opposite sides cannot absolutely be pressed at the same time.

2

When the four push buttons are employed in place of the cross key pad, such a disadvantage is eliminated. Therefore, there is a certain advantage in employing the four push buttons in place of the cross key pad.

SUMMARY OF INVENTION

Technical Problem

However, a user prefers a controller with which the user is familiar. Thus, for example, when a user who is familiar with the cross key pad uses the controller in which the cross key pad is replaced with the four push buttons, the user may feel stress due to the difference. Moreover, depending on a game to be executed by a user, the operation of pressing two push buttons, which are arranged at diagonal positions of the square among the four push buttons, at the same time may lead to some kind of erroneous operation in the game. Therefore, in some cases, it is preferred that the operation of pressing the two push buttons arranged at diagonal positions at the same time be inhibited.

In view of such points, a user's demand can be met when the technology of allowing a user to basically use the four push buttons of the controller including the four push buttons provided in place of the cross key pad as they are, and also allowing the user to operate the four push buttons as if operating the cross key pad, depending on a case in accordance with a user's need.

However, such technology is not known yet.

The subject application has an object to provide a technology of allowing a user to operate four push buttons of a controller including the four push buttons provided in place of the cross key pad as if operating the cross key pad, depending on a case in accordance with a user's need.

Solution to Problem

The inventors of the subject application propose the following invention to achieve the above-mentioned object.

One embodiment of the invention of the subject application is a controller including: a push-button input module, which is provided in a main body to be grasped by a user, and includes a set of four push buttons configured to give input when pressed. The push buttons each are arranged at positions of vertices of a square. The controller corresponds to the controller including four push buttons described in the "Background Art" section. The controller according to the invention of the subject application is mainly a game controller. However, a machine being a platform for the controller is not particularly limited.

Further, the controller includes a cover member including: a cover fixing portion configured to removably fix the cover member to the push-button input module; and a cover portion, which is an integrated and plate-shaped part, and is configured to cover at least all of the four push buttons of the push-button input module when the cover fixing portion is fixed to the push-button input module. Input by the four push buttons is given by pressing a predetermined position of the cover portion under a state in which the cover fixing portion is fixed to the main body.

The controller includes the cover member. The cover member includes the cover portion, which is an integrated and plate-shaped part and is configured to cover at least all of the four push buttons. Moreover, the cover member includes the cover fixing portion configured to removably fix the cover member to the push-button input module of the controller. When the cover member is mounted to the controller with the cover fixing portion, the cover portion covers all of the four push buttons. In this state, a user is capable of pressing a freely selected push button held in contact with a lower surface of the cover portion by pressing a predetermined position of the cover portion, in other words, by tilting the cover portion. With this, a user can give input by the freely selected push button. As compared to the operation of individually pressing the four push buttons, the operation of pressing the freely selected part of the plate-shaped cover portion is closer to the operation of pressing the distal ends of the arms of the cross key pad as described in the "Background Art" section.

Therefore, when the cover member is fixed to the push-button input module of the controller, a user can operate the four push buttons as if operating the cross key pad. Further, through the operation of pressing the cover portion being the integrated and plate-shaped part, two push buttons located at diagonal positions are prevented from being pressed at the same time, and hence the input from the two push buttons located at diagonal positions is prevented from being given at the same time. This follows to the input by the cross key pad and contributes to a user's benefit. Meanwhile, the cover member can be removed from the push-button input module of the controller. Therefore, a user can use the four push buttons as they are.

That is, with the controller according to the invention of the subject application, the four push buttons of the controller including the four push buttons provided in place of the cross key pad can be operated as if operating the cross key pad, depending on a case in accordance with a user's need.

As mentioned above, the cover portion has such a size and shape as to be capable of covering at least all of the four push buttons. As long as such condition is satisfied, the size and shape of the cover portion may be freely set. For example, the shape of the cover portion may have a cross shape which allows the four push buttons to be positioned below the four arms when the cover member is mounted to the push-button input module. Alternatively, the cover portion may have, for example, a rectangular shape or a circular shape. The cover member may be a circular plate having a center at a gravity center of the square having the vertices on which the four push buttons are located.

Recesses and protrusions may be formed on a surface of the cover portion on a front side, and be configured to allow a user who touches the surface of the cover portion on the front side to perceive, through sense of touch, positions of the four push buttons positioned below the cover portion when the cover fixing portion is fixed to the push-button input module. As mentioned above, under the state in which the cover member is mounted to the push-button input module, the controller of the subject application gives input by the push button through operation of the cover portion placed on the four push buttons. However, when the cover member is mounted to the push-button input module, a user cannot visually recognize the push buttons due to the presence of the cover portion located on the push buttons. Thus, it becomes difficult for a user to recognize which part of the cover portion is to be pressed to give desired input by the push button. However, a user usually operates a controller while steadily looking at a display on which a game image is displayed. Therefore, rather than enabling a user to visually recognize the four push buttons through the cover portion, it is required that recesses and protrusions which enable a user to perceive positions of the push buttons through sense of touch be formed on a surface of the cover portion on a front side. Such configuration enables a user to intuitively give input by the controller while checking positions of the push buttons through sense of touch.

Such recesses and protrusions may be, for example, cross-shaped protrusions or recesses which are arranged so that the four push buttons each are positioned below, for example, peripheries of the distal ends of the four arms, or may be protrusions or recesses which correspond to, for example, the shape and size in plan view of the buttons each provided at positions corresponding to the four pushbuttons. For example, the recesses and protrusions forma cross shape, and, when the cover fixing portion is fixed to the push-button input module, the four push buttons each may be positioned below four arms of the cross.

The cover member according to the invention of the subject application includes the cover fixing portion as mentioned above. Any cover fixing portion may be employed as long as the cover fixing portion is capable of removably fixing the cover member to the push-button input module under a state in which the cover portion covers the four push buttons.

For example, the cover fixing portion may be made of a viscous material and removably adhere to the push buttons. The cover fixing portion may be made of magnet or metal and be attractable by magnetic force to magnet or metal provided to the push-button input module. As another modes, the cover fixing portion may be a sucker, or may be a component which is to be locked or fixed by friction force to the push-button input module.

The cover fixing portion may be configured to removably fix the cover member to the push-button input module under a state in which the recesses and protrusions of the cover portion are positioned so as to be oriented in four directions at intervals of 90° corresponding to the positions of the four push buttons. The recesses and protrusions mentioned above are configured to enable a user to recognize positions of the four push buttons through sense of touch. The recesses and protrusions are typically arranged so as to form a symmetrical shape with respect to four directions at intervals of 90° about a certain point, although not limited thereto. Thus, as long as the cover fixing portion is capable of removably fixing the cover member to the push-button input module under the state in which the above-mentioned recesses and protrusions are positioned so as to be oriented in any of four directions at intervals of 90° corresponding to the positions of the four push buttons, the above-mentioned recesses and protrusions allow a user to intuitively and correctly recognize the positions of the four push buttons.

The cover fixing portion may be locked to at least one of the four push buttons so that orientations of the recesses and protrusions of the cover portion match with any of the four directions at intervals of 90° corresponding to the positions of the four push buttons. As mentioned above, it is preferred that the cover fixing portion be positioned so that the recesses and protrusions of the cover fixing portion are oriented in any of four directions at intervals of 90°. In order to achieve this configuration, it is practically reasonable to suitably position the cover member with respect to something provided to the push-button input module. The push buttons are present on the push-button input module, and hence positions of the push buttons and the directions at intervals of 90° mentioned above are associated with each other. In other words, suitable directions at intervals of 90° in which the cover fixing portion is to be oriented are determined based on the push buttons as a reference. Thus, as long as the cover fixing portion is configured to be locked to at least one of the four push buttons, the cover portion automatically keeps suitable angles with respect to the push buttons when a user fixes the cover fixing portion to the push-button input module. Therefore, such a configuration is convenient.

The cover fixing portion may be provided, for example, on a back side of the cover portion. In this case, no particular contrivance is required for the main body of the controller such as the push-button input module. While no particular contrivance is required for the main body side of the controller, the cover member for the controller of the subject application can be mounted to, for example, an existing controller for use.

Meanwhile, when the cover fixing portion is provided on aback side of the cover portion, the push-button input module may include a controller fixing portion configured to removably fix the cover member to the cover fixing portion through engagement with the cover fixing portion. When any contrivance (controller fixing portion) for allowing engagement with the cover fixing portion of the cover member is given also to the main body side of the controller, the cover member may be mounted only to a particular product including the controller fixing portion. Meanwhile, in such case, the cover member can be more reliably fixed.

For example, one of the cover fixing portion and the controller fixing portion is a protruding portion, and the other of the cover fixing portion and the controller fixing portion is a recessed portion. The cover fixing portion and the controller fixing portion may be engaged through insertion of the protruding portion into the recessed portion so that the cover fixing portion and the controller fixing portion are removably fixed to each other.

As described above, the cover member is removably fixed to the push-button input module in the main body of the controller. There arises a problem in handling of the cover member when the cover member is removed from the push-button input module. The cover member having been removed from the main body is not so large, and hence there is a high possibility that a user loses the cover member. Meanwhile, when management for preventing the loss of the cover member is responsibility of a user, such management requires greater effort to be made by a user.

In order to solve such a problem, the controller may be configured so that when a state in which the cover fixing portion is fixed to the push-button input module is cancelled, the cover member is removably fixed to a portion of the main body at which the cover member does not interfere with a user's finger when the user grasps the controller in a normal method. With such configuration, when the cover member is not used, the cover member can be fixed to the main body of the controller. Therefore, the loss of the cover member can be prevented when the cover member is not used. Moreover, the cover member in the case in which the cover member is fixed to the main body is located at a portion of the main body at which the cover member does not interfere with a user's finger when the user grasps the controller in a normal method. Therefore, a user who uses the controller is prevented from having unpleasant feeling caused by interference between a finger and the cover member.

The inventors of the subject application also propose the following cover member in addition to the above-mentioned controller as one embodiment of the invention of the subject application.

As one example, proposed is a cover member, which is to be used in combination with a controller. The controller includes a push-button input module. The push-button input module is provided in a main body to be grasped by a user, and includes a set of four push buttons, which are configured to give input when pressed, and a controller fixing portion. The push buttons each are arranged at positions of vertices of a square.

The cover member includes: a cover fixing portion configured to removably fix the cover member to the controller fixing portion; and a cover portion, which is an integrated and plate-shaped part, and is configured to cover at least all of the four push buttons of the push-button input module when the cover fixing portion is fixed to the controller fixing portion. Input by the four push buttons is given by pressing a predetermined position of the cover portion under a state in which the cover fixing portion is fixed to the push-button input module.

Effects of the cover member are the same as the effects of the controller including the controller fixing portion.

DESCRIPTION OF EMBODIMENTS

Now, a description is given of a preferred embodiment of the present invention with reference to the accompanying drawings.

Figure 1:
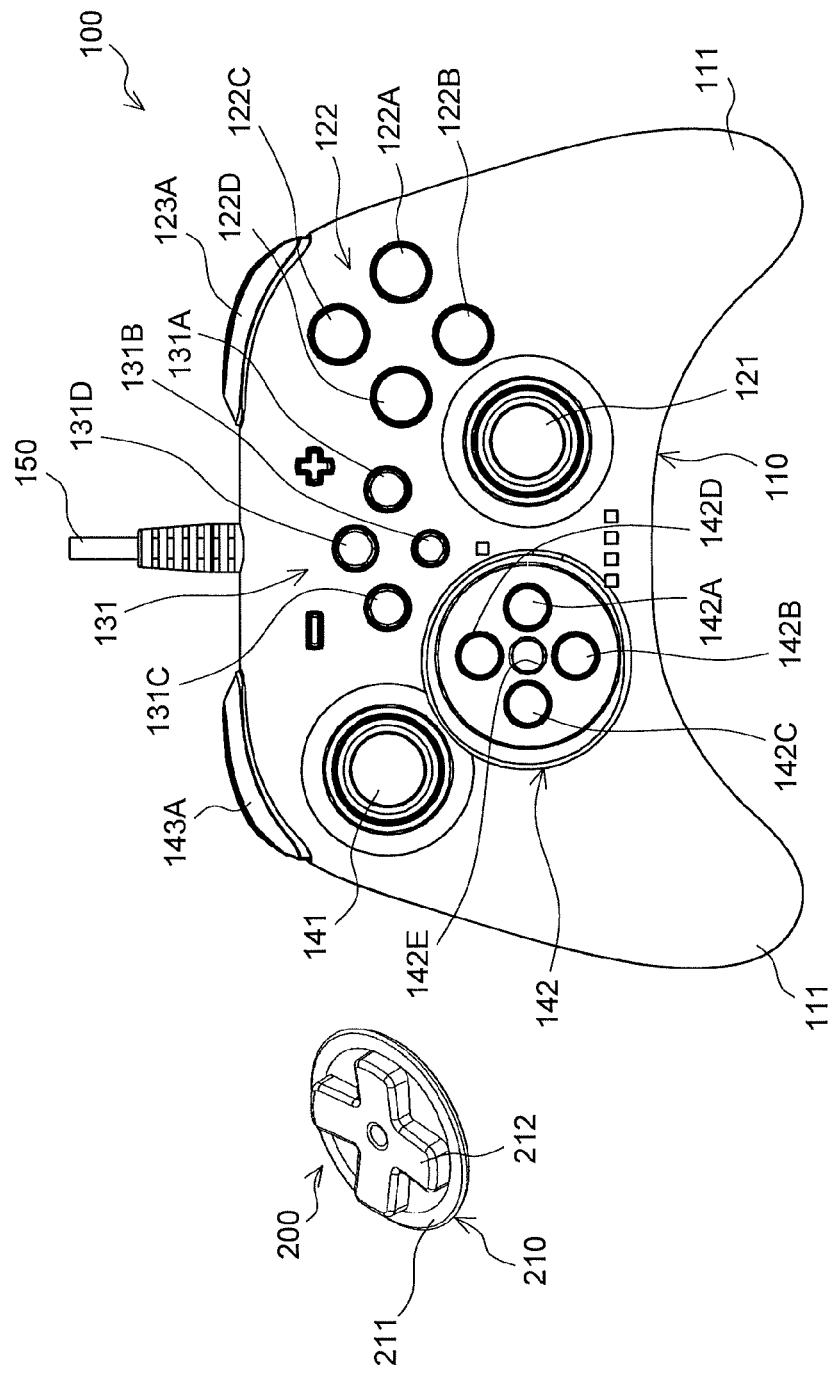
FIG. 1 is a plan view of a main body included in a controller and a perspective view of a cover member according to an embodiment of the present invention.
Figure 2:
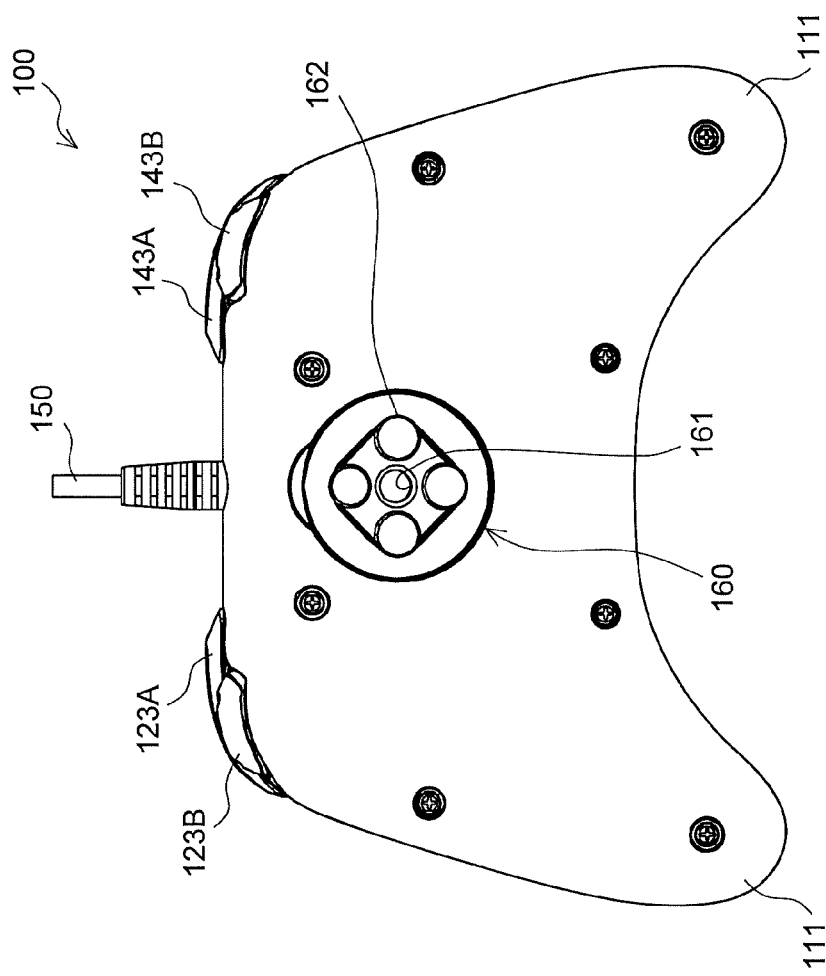
FIG. 2 is a bottom view of the main body illustrated in FIG. 1.
Figure 3:
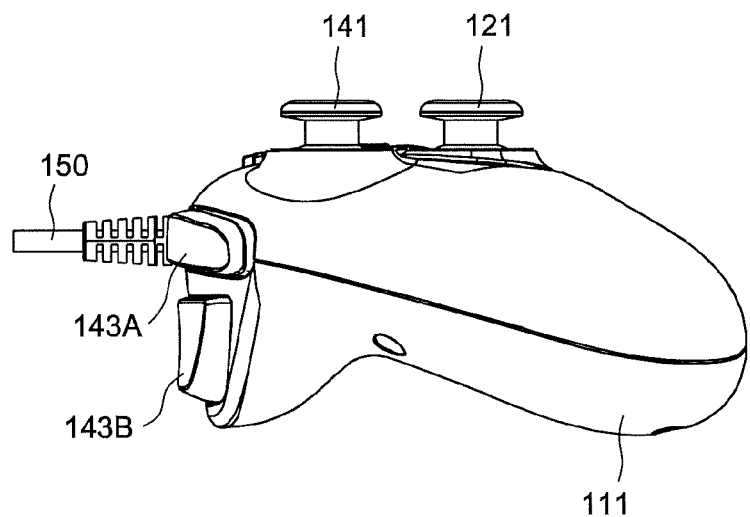
FIG. 3 is a left side view of the main body illustrated in FIG. 1.
Figure 4:
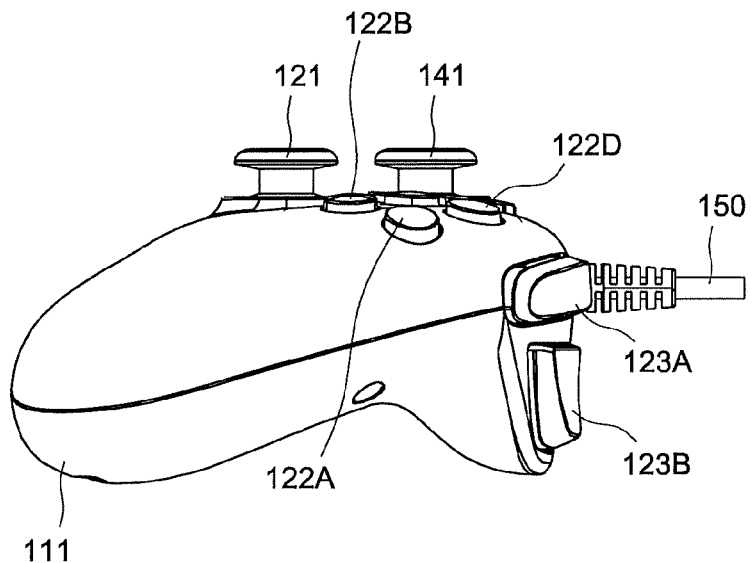
FIG. 4 is a right side view of the main body illustrated in FIG. 1.
Figure 5:
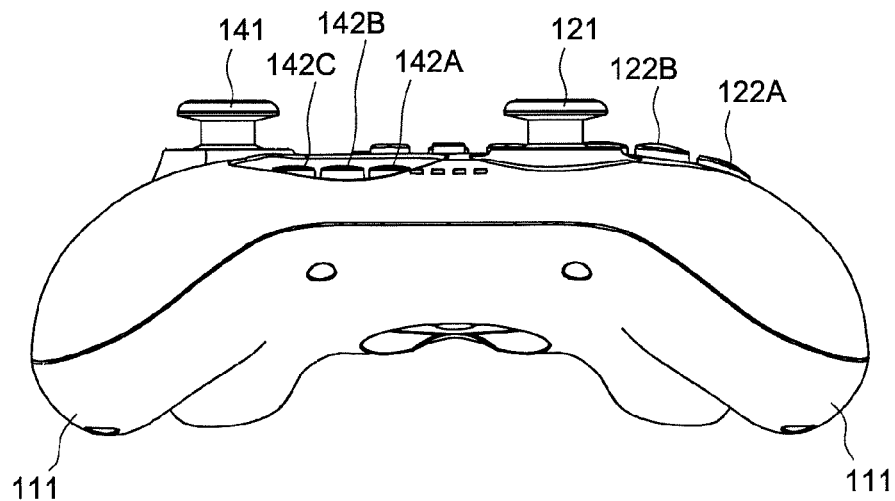
FIG. 5 is a front view of the main body illustrated in FIG. 1.
Figure 6:
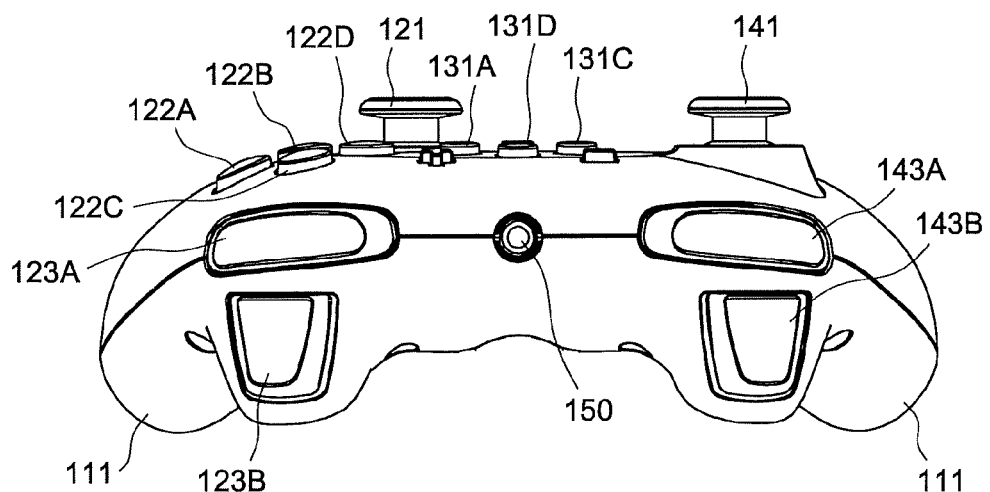
FIG. 6 is a back view of the main body illustrated in FIG. 1.

FIG. 1 is a plan view of a main body 100 of a controller and a perspective view of a cover member 200 according to the invention of the subject application. FIG. 2 is a bottom view of the main body 100 of the controller. FIG. 3 is a left side view of the main body 100 of the controller. FIG. 4 is a right side view of the main body 100 of the controller. FIG. 5 is a front view of the main body 100 of the controller. FIG. 6 is a back view of the main body 100 of the controller.

The controller is configured to give input of data to a predetermined device capable of executing a game. The controller according to this embodiment is configured to give input to a game machine, although not limited thereto. In this context, the controller is a controller for a game machine. The game machine is, for example, a home-use single-purpose game machine of a stationary type. For example, the game machine is PlayStation 4 (trademark) manufactured and distributed by Sony Interactive Entertainment Inc. or Xbox One (trademark) manufactured and distributed by Microsoft Japan Co., Ltd.

As described in the "Background Art" section, the dominant design of the genuine controller in the single-purpose game machine is almost determined, and the design of the controller basically follows such determined design.

As illustrated in FIG. 1, the controller according to this embodiment itself is completed as a controller, and includes the main body 100 and the cover member 200. The main body 100 is configured to allow a user to give input of data. The cover member 200 can be removably fixed to the main body 100 in two modes as described later.

The main body 100 of the controller corresponds to the controller described in the "Background Art" section itself. The main body 100 includes an oblong casing 110 which can be grasped by both hands. On both near sides of the casing 110, grip portions 111 projecting toward the near side are formed so as to allow a user to easily grasp the controller by both hands. The casing 110 is hollow. The casing 110 as well as components which are exposed from the casing 110 are all molded products made of resin in this embodiment, although not limited thereto.

At a lower part in a right side portion of the upper surface of the casing 110, there is provided a first stick input device 121 being an input device of a stick type. The first stick input device 121 is an input device having a lower end connected to the main body 100 and being configured to perform a pivot motion in all directions with the portion connected to the main body 100 as a support point. A user is allowed to give desired input based on a tilt direction of the first stick input device 121.

At an upper part in the right side portion of the upper surface of the casing 110, there is provided a first push-button input module 122 of a push-button type including a set of four push buttons 122A, 122B, 122C, and 122D arranged at right, lower, upper, and left positions, respectively. All of the push buttons 122A, 122B, 122C, and 122D can be pressed with respect to the casing 110. A user can give input, which mainly relates to operation of a game, allocated to each of the push buttons 122A, 122B, 122C, and 122D by pressing freely selected one of the push buttons 122A, 122B, 122C, and 122D with respect to the casing 110. Although there is no clear boundary, the first push-button input module 122 corresponds to a predetermined area on a surface of the casing 110 which collectively surrounds the four push buttons 122A, 122B, 122C, and 122D and somewhat outer sides of those.

At the right side portion of the back surface of the casing 110, there are provided two trigger buttons 123A and 123B which are arrayed in an up-and-down direction. The trigger buttons 123A and 123B can be pressed toward the near side with respect to the casing 110. A user can give input, which mainly relates to operation of a game, allocated to each of the trigger buttons 123A and 123B by pressing freely selected one of the trigger buttons 123A and 123B with respect to the casing 110.

All of the first stick input device 121, the four push buttons 122A, 122B, 122C, and 122D of the first push-button input module 122, and the trigger buttons 123A and 123B may be of the publicly known type or the well-known type. In this embodiment, such components of the publicly known type or the well-known type are employed.

At the center on the upper surface of the casing 110 in a width direction, there is provided a second push-button input module 131 of the push-button type including a set of four push buttons 131A, 131B, 131C, and 131D arranged at right, lower, left, and upper positions, respectively. Similarly to the push buttons 122A, 122B, 122C, and 122D, all of the push buttons 131A, 131B, 131C, and 131D can be pressed with respect to the casing 110. A user can give input allocated to each of the push buttons 131A, 131B, 131C, and 131D by pressing freely selected one of the push buttons 131A, 131B, 131C, and 131D with respect to the casing 110. The input allocated to each of the push buttons 131A, 131B, 131C, and 131D relates to, for example, pausing of a game or operation of a power supply of the game machine, which is not mainly related to operation of a game. Although there is no clear boundary, the second push-button input module 131 corresponds to a predetermined area on a surface of the casing 110 which collectively surrounds the four push buttons 131A, 131B, 131C, and 131D and somewhat outer sides of those.

All of the four push buttons 131A, 131B, 131C, and 131D may be of the publicly known type or the well-known type. In this embodiment, such components of the publicly known type or the well-known type are employed.

At an upper part in the left side portion of the upper surface of the casing 110, there is provided a second stick input device 141 being an input device of the stick type. The second stick input device 141 has a configuration which is similar to that of the first stick input device 121, and a user can give desired input through operation of the second stick input device 141.

At a lower part in the left side portion of the upper surface of the casing 110, there is provided a third push-button input module 142 of the push-button type including a set of four push buttons 142A, 142B, 142C, and 142D arranged at right, lower, left, and upper positions, respectively. Among the first push-button input module 122, the second push-button input module 131, and the third push-button input module 142, only the third push-button input module 142 corresponds to the push-button input module of the invention of the subject application. Similarly to the push buttons 122A, 122B, 122C, and 122D, all of the push buttons 142A, 142B, 142C, and 142D can be pressed with respect to the casing 110. A user can give input, which mainly relates to operation of a game, allocated to each of the push buttons 142A, 142B, 142C, and 142D by pressing freely selected one of the push buttons 142A, 142B, 142C, and 142D with respect to the casing 110.

A circular area which is defined on a surface of the casing 110 on an upper side and includes the pushbuttons 142A, 142B, 142C, and 142D is recessed one step (about 6 mm in this embodiment, although not limited thereto) from the surface of the casing 110 in a cylindrical shape. The push-buttons 142A, 142B, 142C, and 142D are provided on a circular flat surface at the bottom of the recess. The push buttons 142A, 142B, 142C, and 142D each have a circular shape in plan view, and have equal diameters. The amounts of projection from the casing 110 given when a force is not applied are also equal. Moreover, centers of the push buttons 142A, 142B, 142C, and 142D are positioned at four vertices of a predetermined square in plan view of the main body 100. The space having a circular cross section including the pushbuttons 142A, 142B, 142C, and 142D is defined as the third push-button input module 142 in this embodiment. As a matter of course, the shape of the third push-button input module 142 in plan view may be other shape such as an oval shape or a rectangular shape including the square.

In this embodiment, at a center of the bottom of the third push-button input module 142, there is formed a recessed portion 142E being a hole having a circular cross section. The recessed portion 142E has a bottom, and a depth of the recessed portion 142E from the circular bottom of the third push-button input module 142 is set to about 7 mm in this embodiment, although not limited thereto.

At the left side portion of the back surface of the casing 110, there are provided two trigger buttons 143A and 143B which are arrayed in the up-and-down direction. The trigger buttons 143A and 143B have a configuration similar to that of the trigger buttons 123A and 123B. A user can give input, which mainly relates to operation of a game, through operation of the trigger buttons 143A and 143B.

All of the second stick input device 141, the four push buttons 142A, 142B, 142C, and 142D of the third push-button input module 142, and the trigger buttons 143A and 143B may be of the publicly known type or the well-known type. In this embodiment, such components of the publicly known type or the well-known type are employed.

A connection cord 150 is connected to the back surface of the casing 110. In all of the drawings, the connection cord 150 is depicted in a state of being cut in the middle part thereof. The connection cord 150 is a cord including a cable configured to transmit input given by the controller to a game machine (not shown).

As is well known, it is not always required that transmission of input given by the controller to the game machine be performed by wire as in the case of using the connection cord 150. When the transmission of the input is to be performed in a wireless manner, the connection cord 150 can be omitted.

At a position near a center in the width direction and near the center in the front-and-rear direction on the bottom surface of the casing 110, there is formed an accommodating portion 160. The position on the casing 110 at which the accommodating portion 160 is present is a position at which a user's finger does not reach the accommodating portion 160 when a user grasps the main body 100 or the casing 110 at the time of use of the controller by the user.

The accommodating portion 160 is formed of the surface of the bottom surface of the casing 110 which is recessed one step in a cylindrical shape. A diameter of the accommodating portion 160 is set so as to be substantially equal to a diameter of the circular bottom surface at the bottom of the third push-button input module 142. In this embodiment, the diameters are practically set equal to each other, although not limited thereto. The accommodating portion 160 has a bottom, and a depth of the accommodating portion 160 from the surface of the bottom surface of the casing 110 is set to about 6 mm in this embodiment, although not limited thereto.

In this embodiment, at the center of the bottom of the accommodating portion 160, there is formed an accommodating recessed portion 161 being a hole having a circular cross section. The accommodating recessed portion 161 has a bottom, and a depth of the accommodating recessed portion 161 from the bottom of the accommodating portion 160 is about 10 mm in this embodiment, although not limited thereto. A diameter of the accommodating recessed portion 161 is substantially equal to a diameter of the recessed portion 142E. In this embodiment, the diameters are practically set equal to each other, although not limited thereto.

At the bottom of the accommodating portion 160, there is formed a receiving portion 162 having recesses and protrusions corresponding to a shape of a locking portion, which is described later, provided on a back surface of the cover member 200.

Figure 7:
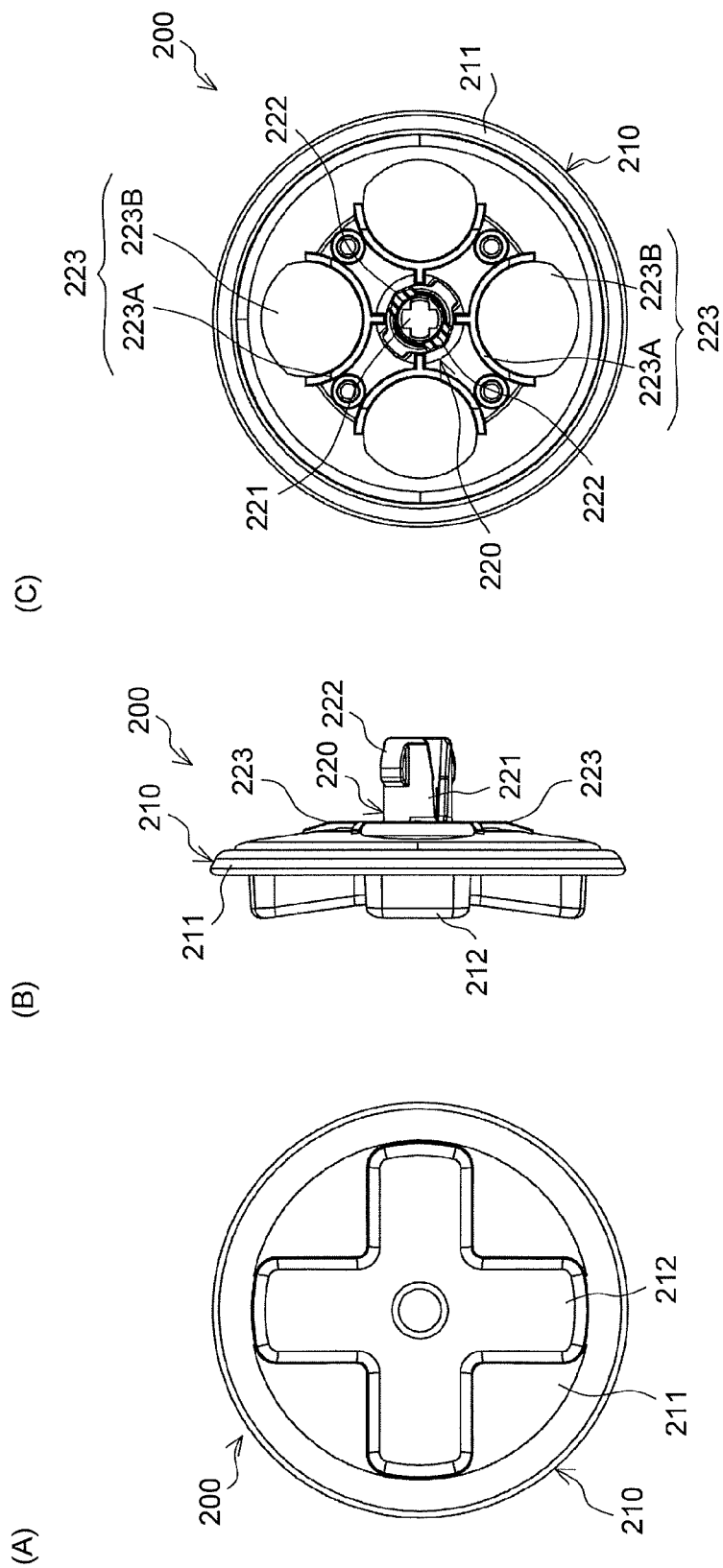
FIG. 7(A) is a plan view of the cover member illustrated in FIG. 1.
FIG. 7(B) is a side view of the cover member illustrated in FIG. 1.
FIG. 7(C) is a bottom view of the cover member illustrated in FIG. 1.

Next, a configuration of the cover member 200 is described. FIG. 7(A) is a plan view of the cover member 200. FIG. 7(B) is a side view of the cover member 200. FIG. 7(C) is a bottom view of the cover member 200.

The cover member 200 includes a cover portion 210 having a plate shape as a whole. The cover portion 210 includes a circular plate portion 211 being a circular plate having a circular shape in plan view. A diameter of the circular plate portion 211 is set somewhat smaller than a diameter of a cross section of the third push-button input module 142 being the space having a cylindrical shape. The cover portion 210 includes a cross-key-pad portion 212 on an upper surface of the circular plate portion 211. The cross-key-pad portion 212 projects in a cross shape from the surface of the circular plate portion 211. A center of four arms of the cross-key-pad portion 212 in plan view matches with a center of the circular plate portion 211. The shape of the circular plate portion 211 may be set, for example, so as to match with a sectional shape of the third push-button input module 142 and be formed slightly smaller than the sectional shape of the third push-button input module 142.

On the back surface of the cover member 200, there is provided a cover fixing portion 220. The cover fixing portion 220 is configured to removably fix the cover member 200 to the main body 100 of the controller.

The cover fixing portion 220 includes a column portion 221 having a circular cross section, which extends perpendicularly to the circular plate portion 211 from the center of the back surface of the circular plate portion 211. On an outer side of the distal end of the column portion 221, there are formed spring portions 222. The spring portions 222 are formed so as to be bent from the distal end of the column portion 221 toward a base end of the column portion 221. When a force in a direction toward a center of the column portion 221 is applied, the spring portions 222 approach the column portion 221. In this state, the spring portions 222 generate an elastic force for restoring the spring portions 222 to an original state. A diameter of the column portion 221 is substantially equal to a diameter of the recessed portion 142E. More specifically, the diameter of the column portion 221 is slightly smaller than the diameter of the recessed portion 142E.

On the back surface of the cover member 200, there are formed locking portions 223 being part of the cover fixing portion 220. In this embodiment, four locking portions 223 are provided so as to be arranged at symmetrical positions at intervals of 90° about the column portion 221. The locking portions 223 each include a locking wall 223A and a recessed surface 223B. The locking wall 223A is a substantially C-shaped wall which is opened outward. The recessed surface 223B is a cup-shaped recess which is formed in an area surrounded by the locking wall 223A.

The locking wall 223A is formed by cutting out a part of an arc, and a diameter of an inner surface of the arc is equal to a diameter of each of the four push buttons 142A, 142B, 142C, and 142D of the third push-button input module 142. The amounts of projection of the locking walls 223A from the back surface of the circular plate portion 211 substantially correspond to the amounts of projection of the push buttons 142A, 142B, 142C, and 142D from the casing 110, and are each, for example, approximately 2 mm. The recessed surfaces 223B are curved surfaces substantially corresponding to curves formed on upper surfaces of the push buttons 142A, 142B, 142C, and 142D.

In the casing 110, there is provided a publicly known or well-known circuit board (not shown) having, for example, a function of generating signals based on input from a large number of input devices including the first stick input device 121, the four push buttons 122A, 122B, 122C, and 122D of the first push-button input module 122, and the trigger buttons 123A and 123B, and a function of transmitting the generated signals to a game machine through the connection cord 150.

A description is given of a method of using the controller described above, and an operation of the controller.

The method of using the controller and the operation of the controller are not different from a general method of using the controller and a general operation of the controller, except for methods of using the third push-button input module 142, the accommodating portion 160, and the cover member 200, and operations of the third push-button input module 142, the accommodating portion 160, and the cover member 200. In the following, a description is given mainly of features different from the general method of using the controller and the general operation of the controller.

When the controller is to be used, a user selects between use of the push buttons 142A, 142B, 142C, and 142D of the third push-button input module 142 as they are, that is, input by directly pressing the push buttons 142A, 142B, 142C, and 142D by a finger and input by indirectly pressing the push buttons 142A, 142B, 142C, and 142D through the cover member 200 as described later.

A description is given of the case in which the user selects input of the push buttons 142A, 142B, 142C, and 142D through the cover member 200.

The cover member 200 is fixed to the third push-button input module 142 through insertion of the column portion 221, which is provided on the back side of the cover portion 210, into the recessed portion 142E being a hole formed at the center of the third push-button input module 142. When the column portion 221 is inserted into the recessed portion 142E, the spring portions 222 provided at the distal end of the column portion 221 receive a force from an inner peripheral surface of the recessed portion 142E and are compressed toward the column portion 221. Meanwhile, the spring portions 222 press the inner peripheral surface of the recessed portion 142E. Friction which is generated by this action between the spring portions 222 and the inner peripheral surface of the recessed portion 142E causes the column portion 221 to be fixed to the recessed portion 142E. As a result, the cover member 200 is fixed to the third push-button input module 142.

Figure 8:
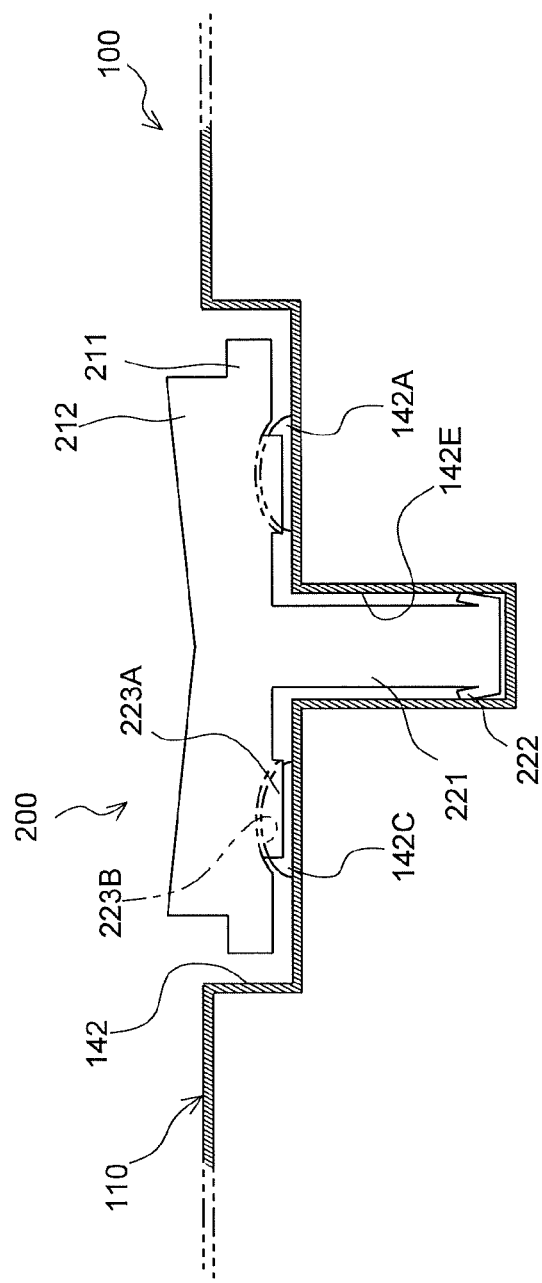
FIG. 8 is an enlarged sectional view for illustrating a periphery of a third push-button input module and the cover member, and is a schematic illustration of a state in which the cover member is mounted to the third push-button input module of the controller illustrated in FIG. 1.
Figure 9:
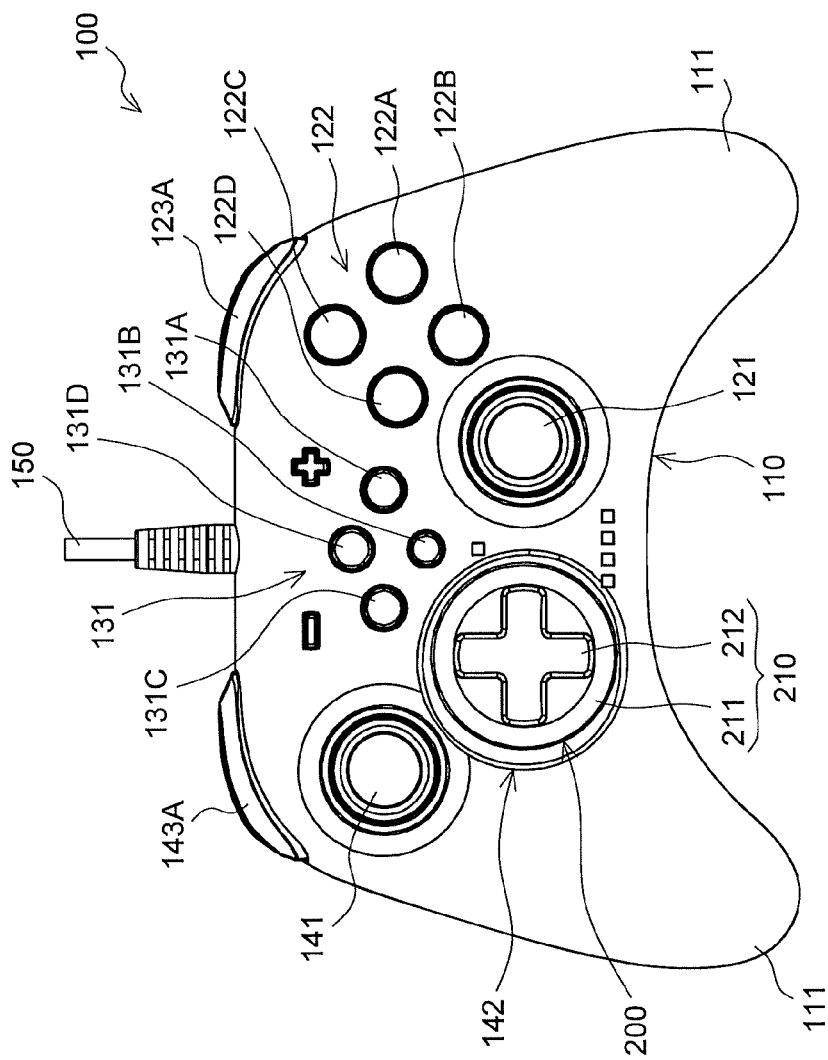
FIG. 9 is a plan view of the controller with the cover member mounted to the third push-button input module.

A description is given more in detail. When the cover member 200 is to be fixed to the third push-button input module 142, a user inserts the column portion 221 into the recessed portion 142E to some extent, and in this state, rotates the entirety of the cover member 200 in a right-and-left direction by a suitable angle about the column portion 221 having been inserted into the recessed portion 142E. With this, the locking walls 223A of the four locking portions 223 at the bottom surface of the cover portion 210 are fitted to outer sides of the push buttons 142A, 142B, 142C, and 142D, respectively, and at the same time, the four recessed surfaces 223B cover the upper surfaces of the push buttons 142A, 142B, 142C, and 142D while extending along the upper surfaces (FIG. 8 and FIG. 9). At the moment at which the locking walls 223A of the four locking portions 223 are fitted to the outer sides of the pushbuttons 142A, 142B, 142C, and 142D, respectively, and at the same time, the four recessed surfaces 223B cover the upper surfaces of the pushbuttons 142A, 142B, 142C, and 142D while extending along the upper surfaces from the cover member 200. With the feeling of clicking, the user can recognize that the cover member 200 is positioned at a correct position (correct angle about the column portion 221) and is fixed to the third push-button input module 142.

In this state, the column portion 221 of the cover member 200 is not drawn out from the recessed portion 142E unless a certain amount of force is applied. Moreover, the four locking walls 223A are fitted to the outer sides of the push buttons 142A, 142B, 142C, and 142D, respectively, and hence the cover member 200 does not rotate about the column portion 221.

Moreover, under the state in which the cover member 200 is positioned at the correct position, the push buttons 142A, 142B, 142C, and 142D are positioned below the four arms of the cross-key-pad portion 212 of the cover portion 210. The above-mentioned four correct positions are present at intervals of 90° so as to correspond to positioning of the push buttons 142A, 142B, 142C, and 142D at the vertices of the imaginary square. However, as long as the cover member 200 is fixed to the third push-button input module 142 at any of the four positions (directions), the push buttons 142A, 142B, 142C, and 142D are positioned below the four arms of the cross-key-pad portion 212, respectively.

As described above, in this embodiment, the column portion 221 of the cover member 200 is inserted into the recessed portion 142E of the third push-button input module 142 so that the cover member is fixed to the third push-button input module 142. That is, there is given a relationship in which the former is inserted into the latter, and the former is a protrusion and the latter is a recess. However, this relationship may be inversed. This similarly applies to the relationship between the column portion 221 and the accommodating recessed portion 161.

In this state, a user operates the controller.

Under the state in which the cover member 200 is fixed to the third push-button input module 142, the four recessed surfaces 223B on the lower surface of the circular plate portion 211 are held in a state of being in slight contact or non-contact with the push buttons 142A, 142B, 142C, and 142D.

In this state, a user presses any one of the arms of the cross-key-pad portion 212. With this, the cover portion 210 is tilted with respect to the column portion 221, and any one of the push buttons 142A, 142B, 142C, and 142D positioned below the pressed arm is pushed and pressed by the lower surface of the circular plate portion 211 or the lower surface of the recessed surface 223B. The cover member 200 is a molded product made of resin. Thus, the connection portion between the cover portion 210 and the column portion 221 has a suitable stiffness for allowing occurrence of the tilt of the cover portion 210 mentioned above. With this, as in the case of the publicly known or well-known controller, a signal corresponding to any one of the push buttons 142A, 142B, 142C, and 142D having been pressed is generated, and the generated signal is output to the game machine through the connection cord 150.

When a user uses the cover member 200 to give input to the push buttons 142A, 142B, 142C, and 142D included in the third push-button input module 142, the push button 142A and the push button 142C which are arranged at diagonal positions of the imaginary square are prevented from being pressed at the same time. Moreover, the push button 142B and the push button 142D are also prevented from being pressed at the same time. The circular plate portion 211 has such a high stiffness that such actions are prevented.

Operation of pressing two adjacent arms of the cross-key-pad portion 212 at the same time (in such case, the circular plate portion 211 causes downward tilt toward a portion between the two pressed arms) to press two adjacent push-buttons among the four push buttons 142A, 142B, 142C, and 142D at the same time is allowed even when the cover member 200 is fixed to the third push-button input module 142.

When a user uses the controller with the push buttons 142A, 142B, 142C, and 142D of the third push-button input module 142 as they are, it is only required that the cover member 200 be removed from the main body 100.

When the cover member 200 is to be removed from the main body 100, it is only required that a user pull up the cover member 200 with a force overcoming the friction force between the spring portions 222 and the inner peripheral surface of the recessed portion 142E, and draw out the column portion 221 of the cover member 200 from the recessed portion 142E of the casing 110. With this action, the cover member 200 is removed from the main body 100.

Figure 10:
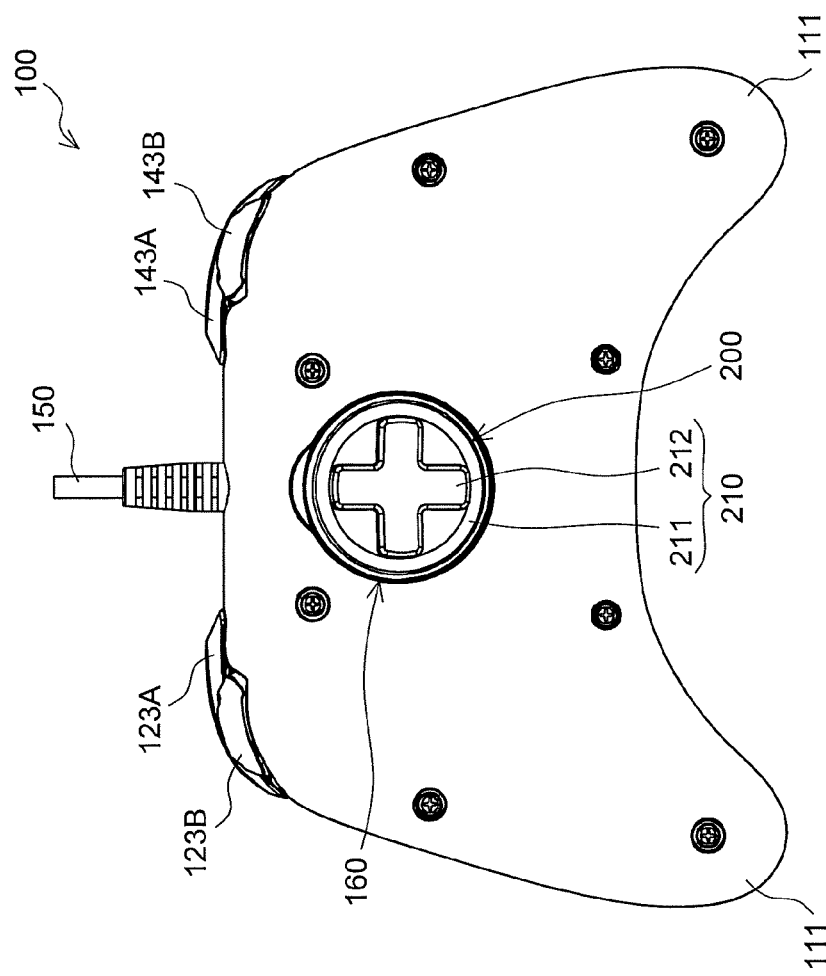
FIG. 10 is a bottom view of the controller with the cover member mounted to the third push-button input module.
Figure 11:
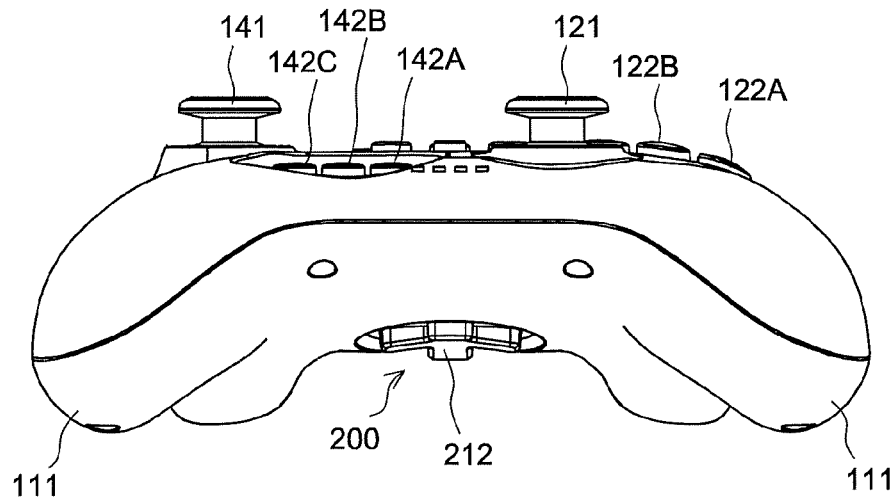
FIG. 11 is a front view of the controller with the cover member mounted to the third push-button input module.
Figure 12:
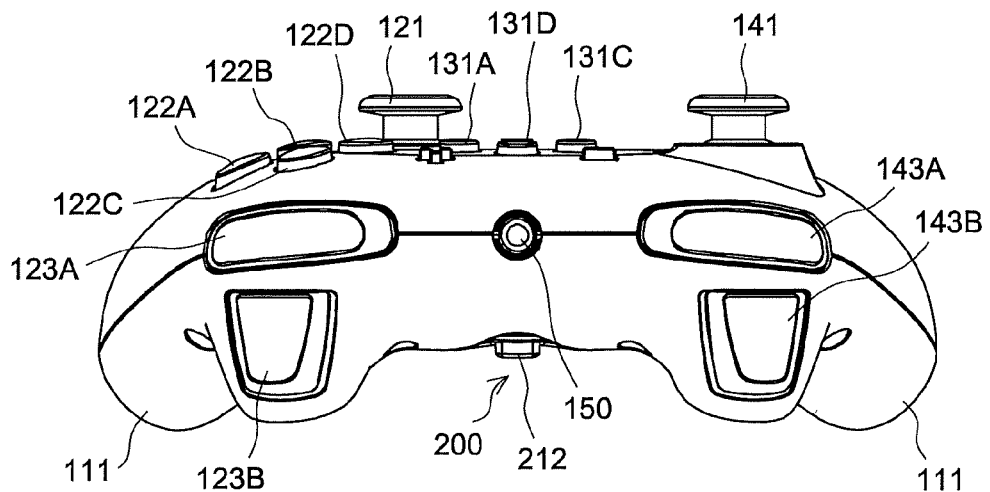
FIG. 12 is a back view of the controller with the cover member mounted to the third push-button input module.

The cover member 200 may be managed by a user as it is. However, in such case, there is a fear in that the cover member 200 is to be lost. Therefore, a user typically fixes the cover member 200 to the accommodating portion 160 at the bottom surface of the casing 110 to accommodate the cover member 200 thereat (FIG. 10, FIG. 11, and FIG. 12). Such state may be set as a state of the controller given when the user does not use the controller. Moreover, it may also be set as a default state given in a case of selling the cover member 200 and the main body 100 as a set.

In order to fix the cover member 200 to the accommodating portion 160 of the main body 100 to accommodate the cover member 200 thereat, in a manner similar to the case in which the cover member 200 is removably fixed to the third push-button input module 142, a user fixes the column portion 221 of the cover fixing portion 220 of the cover member 200 to the accommodating recessed portion 161. The friction force which is generated between the spring portions 222 and the inner peripheral surface of the accommodating recessed portion 161 causes the column portion 221 to be fixed to the accommodating recessed portion 161. The operation of fixing the cover member 200 to the accommodating portion 160 is similar to that in the case in which the cover member 200 is fixed to the third push-button input module 142. Moreover, when the cover member 200 is to be fixed to the accommodating portion 160, similarly to the case in which the cover member 200 is fixed to the third push-button input module 142, a user presses the column portion 221 into the accommodating recessed portion 161 to some extent, and in this state, rotates the cover member 200 about the column portion 221. With this, the locking walls 223A and the recessed surfaces 223B on the lower side of the cover member 200 are firmly fitted to the receiving portion 162 at the bottom of the accommodating recessed portion 161. At that time, the user realizes feeling of clicking and is capable of recognizing the state in which the cover member 200 is firmly fitted to the accommodating recessed portion 161. In simple words, the receiving portion 162 has a shape resembling the shape of the bottom surface of the third push-button input module 142. More in detail, the receiving portion 162 has four protruding portions resembling the shape of the portions of the four push buttons 142A, 142B, 142C, and 142D exposed from the bottom surface of the third push-button input module 142. The four protruding portions are surrounded by the locking walls 223A on the lower side of the cover member 200, and are brought into abutment against the recessed surfaces 223B. With this action, the cover member 200 fixed to the accommodating portion 160 is always fixed to any of the directions of four angles at intervals of 90°.

The term "accommodating" is used for the accommodating portion 160. However, when the cover member 200 is fixed to the accommodating portion 160, a part of the cover member 200, for example, the cross-key-pad portion 212 may partially be exposed from the accommodating portion 160 (FIG. 11 and FIG. 12).

In this state, a user can cause any one of the signals allocated to the push buttons 142A, 142B, 142C, and 142D to be generated by directly pressing freely selected at least one of the four push buttons 142A, 142B, 142C, and 142D as if pressing the push buttons of a normal controller. At this time, the accommodating portion 160 and the cover member 200 fixed thereto and accommodated therein are not brought into contact with a finger of a user who gives input using the controller. As a matter of course, the generated signal is transmitted to the game machine through the connection cord 150.

A method of removing the cover member 200 from the accommodating portion 160 follows the method of removing the cover member 200 from the third push-button input module 142.

As the cover member 200 to be provided to a user, there may be provided various types of cover members 200 having materials and colors different from those of the above-mentioned cover member 200 or various types of cover members 200 having dimensions somewhat different from those of the above-mentioned cover member 200. In such a manner, a user can select favorite cover member 200, and hence increase in user's satisfaction can be expected.

The invention claimed is:

1. A controller comprising: a main body to be grasped by a user; a push-button input module that is provided in the main body, the push-button input module including a set of four push buttons configured to provide input when pressed, the push buttons each being arranged at positions of vertices of a square; and a cover member that is an integrated and molded part made of resin, the cover member including a cover portion and a protruding cover fixing column portion and wherein:

the push-button input module includes a controller fixing recessed portion configured to engage with the protruding cover fixing portion such that the cover fixing portion protrudes from a back side of the cover portion and is configured for insertion into the recessed portion to removably fix the cover member to the push-button input module through engagement with the cover fixing portion;

wherein the cover fixing portion is a protruding column portion, and the controller fixing portion is a recessed portion, and wherein the cover fixing portion and the controller fixing portion are engaged through insertion of the protruding column portion into the recessed portion so that the cover fixing portion and the controller fixing portion are removably fixed to each other; and wherein the cover portion is a plate-shaped part that is configured to cover at least all of the four push buttons of the push-button input module when the cover fixing portion is fixed to the main body;

wherein input by the four push buttons is provided by pressing a predetermined position of the cover portion under a state in which the cover fixing portion is fixed to the push-button input module;

wherein recessed surfaces having a predetermined depth are formed on the back surface of the cover member at positions corresponding to the four push buttons, each of the four push buttons is accommodated in and locked to the corresponding recessed surface; and wherein the protruding column portion has a length that exceeds the depth of the recessed surfaces so that the column portion functions to fix the cover member to the push button input module.

2. A controller according to claim 1, wherein recesses and protrusions are formed on a surface of the cover portion on a front side, and are configured to allow a user who touches the surface of the cover portion on the front side to perceive, through sense of touch, positions of the four push buttons positioned below the cover portion when the cover fixing portion is fixed to the push-button input module.

3. A controller according to claim 2, wherein the cover fixing portion is configured to removably fix the cover member to the push-button input module under a state in which the recesses and protrusions of the cover portion are positioned so as to be oriented in four directions at intervals of 90° corresponding to the positions of the four push buttons.

4. A controller according to claim 2, wherein the recesses and protrusions form a cross shape, and wherein, when the cover fixing portion is fixed to the push-button input module, the four push buttons each are positioned below four arms of the cross.

5. A controller according to claim 3, wherein the cover fixing portion is locked to at least one of the four push buttons so that orientations of the recesses and protrusions of the cover portion match with any of the four directions at intervals of 90° corresponding to the positions of the four push buttons.

6. A controller according to claim 1, wherein the cover member is a circular plate having a center at a gravity center of the square having the vertices on which the four push buttons are located.

7. A controller according to claim 1, wherein, when a state in which the cover fixing portion is fixed to the push-button input module is cancelled, the cover member is removably fixed to a portion of the main body at which the cover member does not interfere with a user's finger when the user grasps the controller in a normal method.

8. A cover member for use in combination with a controller, the controller that has a main body to be grasped by a user, and includes a push-button input module having a set of four push buttons, which are arranged at positions of vertices of a square and configured to give input when pressed, and a controller fixing portion, wherein the cover member is an integrated and plate-shaped part comprising:

a cover fixing portion provided on a back side of the cover portion and configured to removably fix the cover member to the push-button input module through engagement with the cover fixing portion;

a cover portion that is configured to cover at least all of the four push buttons of the push-button input module when the cover fixing portion is fixed to the controller fixing portion, whereby input by the four push buttons is given by pressing a predetermined position of the cover portion under a state in which the cover fixing portion is fixed to the push-button input module;

wherein the cover fixing portion is a protruding column portion, and the controller fixing portion is a recessed portion, and wherein the protruding cover fixing column portion and the recessed controller fixing portion are engaged through insertion of the protruding cover fixing portion into the recessed controller fixing portion so that the cover fixing portion and the controller fixing portion are removably fixed to each other;

wherein recessed surfaces having a predetermined depth are formed on the back surface of the cover member at positions corresponding to the four push buttons, each of the four push buttons is accommodated in and locked to the corresponding recessed surface; and wherein the protruding column portion has a length that exceeds the depth of the recessed surfaces so that the column portion functions to fix the cover member to the push button input module.

* * * * *